(12) United States Patent
Ehrlich

(10) Patent No.: US 9,580,119 B2
(45) Date of Patent: Feb. 28, 2017

(54) GALVANIZED UPPER COUPLER ASSEMBLY

(71) Applicant: Wabash National, L.P., Lafayette, IN (US)

(72) Inventor: Rodney P. Ehrlich, Monticello, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 14/620,517

(22) Filed: Feb. 12, 2015

(65) Prior Publication Data

US 2015/0224835 A1    Aug. 13, 2015

Related U.S. Application Data

(60) Provisional application No. 61/939,538, filed on Feb. 13, 2014.

(51) Int. Cl.
*B62D 53/08* (2006.01)

(52) U.S. Cl.
CPC ...... *B62D 53/0842* (2013.01); *Y10T 29/49888* (2015.01)

(58) Field of Classification Search
CPC ............... B62D 53/0842; B62D 53/084; Y10T 29/49888

See application file for complete search history.

(56) References Cited

U.S. PATENT DOCUMENTS

| | | | |
|---|---|---|---|
| 6,623,868 B1 * | 9/2003 | Shindou | C23C 2/26 428/472.3 |
| 7,931,328 B2 | 4/2011 | Lewallen et al. | |
| 8,485,544 B2 | 7/2013 | McNeil et al. | |
| 8,943,671 B2 | 2/2015 | McNeil et al. | |
| 2010/0096837 A1 | 4/2010 | Ehrlich et al. | |

* cited by examiner

*Primary Examiner* — Kevin Hurley
(74) *Attorney, Agent, or Firm* — Quarles & Brady LLP

(57) ABSTRACT

A trailer coupler assembly includes a grid assembly having a plate and a channel formed on the plate. A kingpin is received in the channel and is positioned to extend below a bottom surface of the plate. The channel is galvanized. A method of making a coupler assembly comprises the steps of providing a grid assembly having a channel, galvanizing the channel, and covering the channel.

3 Claims, 8 Drawing Sheets

GALVANIZED UPPER COUPLER ASSEMBLY

This application claims priority to and the benefit of U.S. Provisional Patent Application No. 61/939,538 filed 13 Feb. 2014, the disclosure of which is now expressly incorporated herein by reference.

FIELD OF THE DISCLOSURE

The present disclosure relates generally to a trailer coupler assembly used to connect together trailers and vehicles, and more specifically to a partially galvanized upper coupler assembly.

BACKGROUND

Trailer coupler assemblies are used to connect trailers to vehicles, such as semi-tractors, trucks, automobiles, or railway cars, for movement of the trailer. Such cargo vehicles may include for example semi-trailers, van-type trailers, flatbed or platform type trailers, container chassis and cargo containers. One or more components of trailer coupler assemblies may corrode and wear over time due in part to corrosive forces, including sand, gravel, gas, oil, rain and other liquid water, ice and snow, as well as the chemicals used to remove snow and ice. To protect from this corrosion, trailer upper coupler assemblies have been coated externally and internally with a variety of materials and methods. Some existing systems have various shortcomings relative to certain applications. For example, a hot-dip process may lead to hydrogen embrittlement or other material changes of the underlying steel. Accordingly, there remains a need for further contributions in this area of technology, including contributions that reduce complexity, cost and weight of applications.

SUMMARY

The present disclosure may comprise one or more of the following features recited in the attached claims and combinations thereof, and/or one or more of the following features and combinations thereof.

In one aspect of the disclosure, an illustrative trailer coupler assembly is disclosed. Other embodiments include apparatuses, systems, devices, hardware, methods, and combinations for resisting corrosion. Further embodiments, forms, features, aspects, benefits, and advantages of the present application shall become apparent from the description and figures provided herewith.

In another illustrative aspect of the disclosure, a trailer coupler assembly comprises: a coupler grid plate, a kingpin channel formed on the coupler grid plate, a kingpin coupled to the coupler grid plate, the kingpin being positioned within the kingpin channel to extend below a bottom surface of the coupler grid plate, and a protective coating applied only to a selected area of the coupler assembly.

Various illustrative embodiments of a trailer coupler assembly are provided. In one illustrative aspect, the trailer coupler assembly illustratively comprises a coupler grid plate, a kingpin coupled to the coupler grid plate, the kingpin being positioned to extend below a bottom surface of the coupler grid plate, and a protective coating applied only to a selected area of the coupler assembly.

According to another illustrative aspect of the present disclosure, a trailer coupler assembly includes a coupler grid assembly. The coupler grid assembly may comprise a coupler grid plate, a support bracket coupled to the grid plate, and a kingpin coupled to the coupler grid plate and the support bracket, the kingpin being positioned to extend below a bottom surface of the coupler grid plate, and a coating applied to a selected portion of the trailer coupler. The trailer coupler assembly may further include an apron assembly.

Illustratively, the coupler assembly may further comprise structure defining a kingpin channel, the defining structure including a pair of spaced apart cross-members disposed generally perpendicular to spaced apart side members of a frame, and wherein the selected area that is selectively coated comprises a portion of the grid plate defining a floor of the kingpin channel, an upper portion of the kingpin, a portion of the cross-members defining the kingpin channel, and a plurality of dividers disposed within the kingpin channel generally perpendicular to the cross-members and parallel to the side members and to one another. The selected area or portion to be selectively coated or sprayed illustratively may extend laterally or transversely to each side of the kingpin about 12 inches to about 20 inches within the kingpin channel. The selected area to be coated may selectively include all structure disposed within and defining this 24 to 40 inches of channel.

In one aspect, an illustrative trailer coupler assembly comprises: a coupler grid plate, a kingpin coupled to the coupler grid plate, the kingpin being positioned to extend below a bottom surface of the coupler grid plate, and a protective coating applied only to a selected area of the coupler assembly. The trailer coupler assembly may further comprise an apron assembly. Illustratively, the selected area comprises a critical area. For example the selected area may comprise the kingpin channel. In another example the selected area is the kingpin channel, the portion of the kingpin residing within the kingpin channel, and the supporting structure defining the kingpin channel and disposed therein. Such supporting structure may comprise the bracket. The selectively coated portion of the kingpin channel, including the sides and walls and floor, may extend about 12 inches to about 20 inches on either side of the kingpin within the channel. In another example selected area is the kingpin channel, the kingpin and the supporting structure defining the kingpin channel and disposed therein. Illustratively, the selected area is the kingpin channel including a pair of spaced apart cross-members disposed generally perpendicular to spaced apart side members of a frame, a portion of the grid plate lying within the kingpin channel, an upper portion of the kingpin, and a plurality of dividers disposed within the channel generally perpendicular to the cross-members and parallel to the side members and to one another. In another example, the selected area is the kingpin channel including a pair of spaced apart cross-members disposed generally perpendicular to spaced apart side members of a frame, a portion of the grid plate lying within the kingpin channel, an upper portion of the kingpin, a support bracket disposed over the kingpin, an apron plate coupled with the kingpin, and a plurality of dividers disposed within the channel generally perpendicular to the cross-members and parallel to the side members and to one another. In yet another example, the selected area comprises the kingpin, an area surrounding the kingpin within the kingpin channel, and an associated supporting structure of the kingpin. In one aspect, the coating is applied in-line during a process of assembling the trailer coupler assembly. The coupler assembly may further comprise a cover plate disposed over the kingpin and coupled together with the frame. The trailer coupler assembly may further comprise drain holes formed in the grid plate within the kingpin box. The drain holes may be formed in an area outside the kingpin box. Illustratively, the coated coupler assembly weighs less than an alternative coupler assembly having substantially identical structure to the illustrative coated coupler disclosed herein, but wherein substantially all of that substantially identical structure is coated. Illustratively, the selectively applied coating of the illustrative coupler assembly weighs between about 1.5 pounds and 3.5 pounds. Further illustratively, the selective coating weighs about 2.5 pounds. Illustratively, the selectively coated coupler assembly weighs about 35 pounds less than the alternate coupler assembly. Illustratively, the coated coupler assembly weighs about 70% to about 80% less than the alternate coupler assembly. Illustratively, the selective coating does not alter the material properties of the coated material. In one aspect of the disclosure, the protective coating is applied using a thermal spray system selected from the group consisting of an electric-arc spray system, a plasma-arc spray system, and a flame spray system. Illustratively, the protective coating is applied using a thermal spray system selected from the group consisting of a conventional spray system, a high velocity spray system, a high-velocity oxy-fuel system, high-velocity air fuel, and a D-gun spray system. The protective coating may be applied using an automated process, for example by a robot. Illustratively, the kingpin is made of a first metal or metal alloy and the coating comprises a second metal or metal alloy having a lower reduction potential than the first metal or metal alloy. In one aspect of the disclosure, the coating includes a metal selected from the list of metals including zinc, magnesium, and aluminum. The coating may comprise zinc. In one aspect, the trailer coupler may further comprise a sacrificial anode coupled to the coupler grid plate. Illustratively, the kingpin is made of a first metal or metal alloy and the sacrificial anode is made of a second metal or metal alloy having a lower reduction potential than the first metal or metal alloy. Further illustratively, the sacrificial anode may be made of zinc, magnesium, or aluminum. In another aspect of the disclosure, the trailer coupler assembly may further comprise a second coating. Illustratively, the second coating comprises a rust preventative coating. The second coating may be an injection coating. The second coating illustratively may comprise a wax coating.

According to another aspect of the present disclosure, a coupler assembly line may include an initial manufacturing station and a galvanizing station. The initial manufacturing station may comprise a station for assembling the coupler assembly. The assembly line illustratively may further include a coupler finishing station. Illustratively, the galvanizing station may include a coating booth configured to coat a selected portion of the coupler assembly.

In one aspect of the disclosure, the coating station may comprise a coating booth and a blasting booth. Illustratively, the coating station coats a selected portion or area of the coupler assembly. The selected portion may comprise a critical portion of the coupler assembly. For example, the portion or area to be coated may comprise the kingpin. In another example, the selected area may comprise the kingpin, the kingpin supporting structure, and the kingpin channel. In one aspect of the disclosure, the coating station comprises a thermal coating station. The coupler assembly line may further comprise a robot. In another aspect, the coupler assembly line further comprises a finishing station. Illustratively, the finishing station comprises a top plate attaching station. In another aspect, the finishing station comprises a second coating station. Illustratively, the second coating station is configured to coat the coupler assembly. Further illustratively, the second coating station may comprise an injection coating station.

The present disclosure includes an illustrative method of making a partially galvanized upper coupler assembly for use in a trailer. The method comprises the step of assembling together a coupler assembly or a portion thereof, for example a grid assembly. The grid assembly illustratively is provided with an open kingpin channel. The method further comprises galvanizing a selected portion of the kingpin channel. The selective galvanizing or coating step may include coating the kingpin. The method may further illustratively comprise closing the kingpin channel. The method may further comprise applying a second coating to the coupler assembly.

Another aspect of the disclosure is a method of making a vehicle coupler assembly comprising the steps of: assembling together a coupler assembly, the coupler assembly comprising a coupler grid plate, a kingpin channel formed on the grid plate and generally comprising a bottom portion comprising the grid plate, and a plurality of side portions comprising a first pair of spaced apart cross-member side walls, and a pair of spaced apart side members generally perpendicular to the side walls and sandwiched therebetween, wherein the side walls and the side members are attached together with the grid plate, a first divider disposed within the kingpin channel and generally perpendicular to the side walls and parallel to the side members, the dividers being sandwiched between the walls, a second divider spaced apart from and parallel to the first divider, a kingpin box defined by the first and second dividers and portions of the cross-member walls therebetween, and a kingpin coupled together with the grid plate and extending below a bottom surface of the coupler grid plate; applying a coating to a selected area of the coupler assembly, the selected area having a surface area less than a total surface area of the coupler assembly; and finishing the coupler assembly.

In another aspect of the disclosure, a method of making a vehicle coupler assembly comprises assembling together a coupler assembly. The coupler assembly illustratively comprises a coupler grid plate. The coupler assembly may further comprise a kingpin channel formed on the grid plate and generally comprising a bottom portion comprising the grid plate and a plurality of side portions comprising a first pair of spaced apart cross-member walls and a pair of spaced apart side members generally perpendicular to the walls and sandwiched therebetween, wherein the walls and the side members are attached together with the grid plate. The illustrative coupler assembly may further comprise a divider disposed within the kingpin channel and generally perpendicular to the walls and parallel to the members, the dividers being sandwiched between the walls. The method may further comprise a second divider spaced apart from and parallel to the first divider, and defining a kingpin box therebetween, the kingpin box further bounded by portions of the respective walls. Illustratively, the coupler assembly further comprises a kingpin. The coupler assembly may further comprise a kingpin supporting structure. The coupler assembly may further comprise a drain hole. The method illustratively may further comprise the step of applying a coating to a selected area of the coupler assembly. Illustratively, the selected area comprises the kingpin box. Illustratively, the selected area may comprise the kingpin channel. In another aspect, the selected area comprises the kingpin channel, the kingpin, the dividers, and the kingpin supporting structure. Illustratively, the method may further comprise the step of closing the kingpin channel. Further illustratively, the closing step may comprise disposing a cover plate over the kingpin channel. A further illustrative aspect may further comprise the step of attaching together the cover plate and the side members. Illustratively, the coating may comprise a galvanizing coating. The method illustratively may further comprise the step of providing drain holes in the grid plate. The coating may be applied at a station positioned in-line of a trailer coupler manufacturing line. Illustratively, the coating does not alter the material properties of the coated material. The coating may be applied using a thermal spray system. The selectively applied or selective protective coating illustratively may be applied using a thermal spray system selected from the group consisting of an electric-arc spray system, a plasma-arc spray system, and a flame spray system. In another aspect, the selective protective coating may be applied using a thermal spray system selected from the group consisting of a conventional spray system, a high velocity spray system, a high-velocity oxy-fuel system, high-velocity air fuel, and a D-gun spray system. The protective coating may be applied using an automated process, may be applied manually, or may be applied using a combination of automated and manual steps. The automated process may comprise a robot. Illustratively, the coating step comprises applying the coating to an approximate thickness of between about 0.2 mils and about 20 mils. In another illustrative embodiment, the coating step comprises applying the coating to an approximate thickness of about 3.0 mils. In one aspect, the coating covers only between about 1% and about 20% of the surface area of the coupler. Illustratively, the selectively applied coating weighs between about 1.5 pounds and 3.5 pounds. Further illustratively, the selective coating weighs about 2.5 pounds. In one aspect, the selective coating weighs about 35 pounds less than an alternate coupler assembly having substantially similar structure. Illustratively, the selectively coated coupler assembly weighs about 70% to about 80% less than the alternate coupler assembly. Illustratively, the kingpin may be made of a first metal or metal alloy and the coating comprises a second metal or metal alloy having a lower reduction potential than the first metal or metal alloy. In one aspect, the selective coating includes a metal selected from the list of metals including zinc, magnesium, and aluminum. Illustratively, the coating comprises zinc. Further illustratively, the selectively applied coating is zinc. In another illustrative aspect of the disclosure, the method may further comprise the step of providing a sacrificial anode coupled to the coupler grid plate. Illustratively, the kingpin is made of a first metal or metal alloy and the sacrificial anode is made of a second metal or metal alloy having a lower reduction potential than the first metal or metal alloy. Such a sacrificial anode may be made from any one of zinc, magnesium, and aluminum. Illustratively, the sacrificial anode is a block of zinc. In an illustrative aspect, the method may further comprise the step of applying a second coating to the coupler assembly. Illustratively, the second coating may comprise a rust preventative coating. In one aspect of the disclosure, the second coating is an injection coating. Illustratively, the second coating is a wax coating. In one aspect, the coating may be applied to an approximate thickness of between about 0.2 mils and about 20 mils. Illustratively, the selectively applied coating has an approximate thickness of about 3.0 mils.

These and other features of the present disclosure will become more apparent from the following description of the illustrative embodiments.

Figure 1:
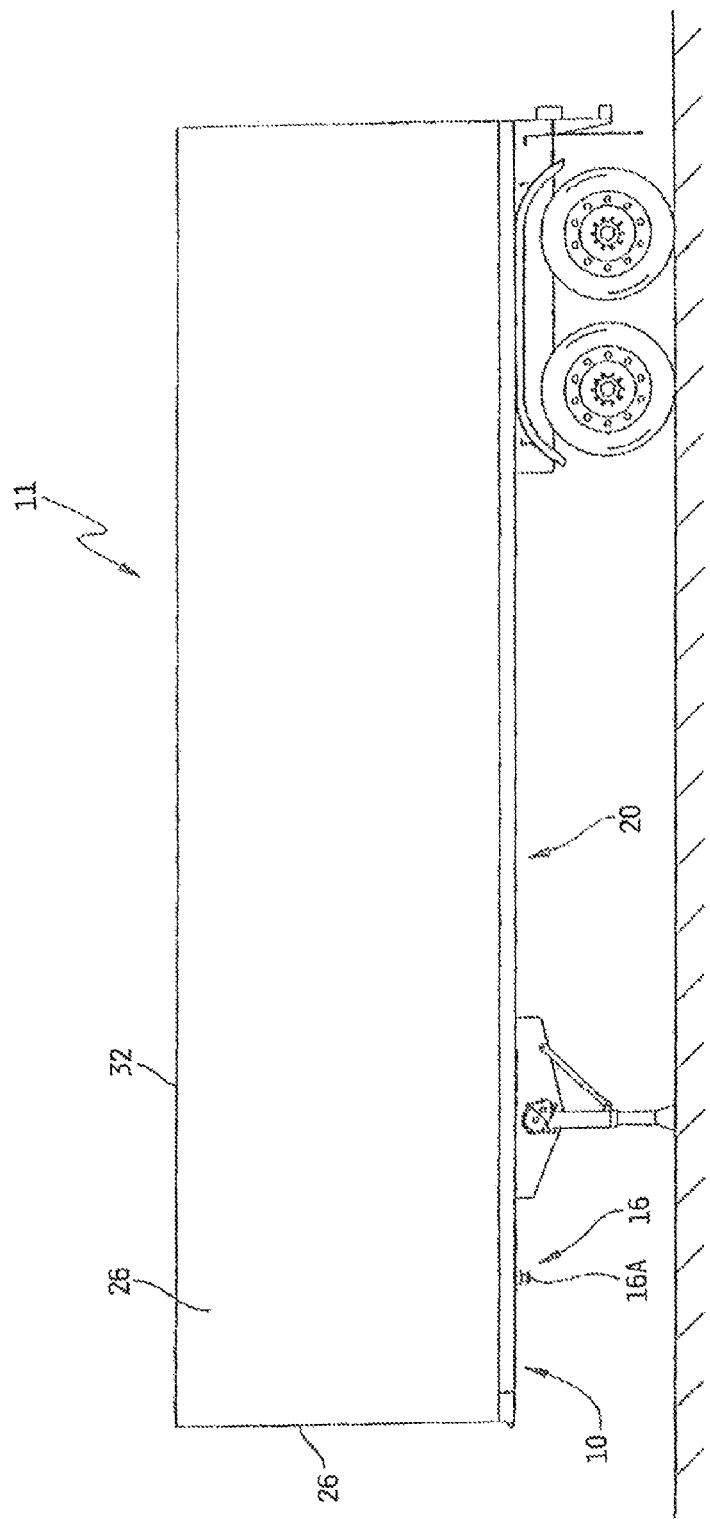
FIG. 1 is a side elevational view of a semi-trailer having an upper coupler assembly employing features of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

For the purposes of promoting an understanding of the principles of the invention, reference will now be made to a number of illustrative embodiments shown in the attached drawings and specific language will be used to describe the same. While the concepts of this disclosure are described in relation to a trailer coupler assembly for use in connecting a trailer to a semi-tractor or a railway car, it will be understood that they are equally applicable to other trailers and trailer coupler assemblies generally, and more specifically to trailer coupler assemblies used with conventional box, van, or flatbed type trailers, examples of which include, but should not be limited to, straight truck bodies, small personal and/or commercial trailers and the like. Further, the concepts of this disclosure are similarly applicable for use with any vehicle underbody or undercarriage, for any type of vehicle, in applications where it is desirable to reduce corrosion and/or corrosion potential. Further, the concepts of this disclosure are similarly applicable for use with any vehicle underbody or undercarriage, for any type of vehicle, in applications where it is desirable to reduce weight.

It should be understood that while the use of words such as preferable preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

FIG. 1 depicts a cargo vehicle or trailer 11 having a floor assembly 20 which includes an illustrative upper coupler assembly 10 in the forward section. The upper coupler assembly 10 illustratively comprises an apron assembly 110 and a grid assembly 115 coupled with a frame 34. The kingpin or grid assembly 115 illustratively comprises a front main channel 25 and an aft channel 25, and a kingpin channel or box 50 defined therebetween. A kingpin 16 may be disposed in the kingpin box 50. A spool 16a having lower portion 19 of kingpin 16 projects from the underside of the floor assembly 20 and is positioned to engage a tractor's fifth wheel or lower coupler (not shown). The kingpin channel 50 may be covered or closed by a cover plate 15. Cover or top plate 15 illustratively is shaped to fit and extend over channel 50. For example, in one illustrative embodiment, cover plate 15 is approximately 10 inches wide and approximately 102 inches long, as are top flat faces or walls 18C of each cross member 18. Cover 15 may be disposed or placed to cover the kingpin channel 50 and be coupled to the frame 34, as for example by welding or other suitable means.

Figure 4:
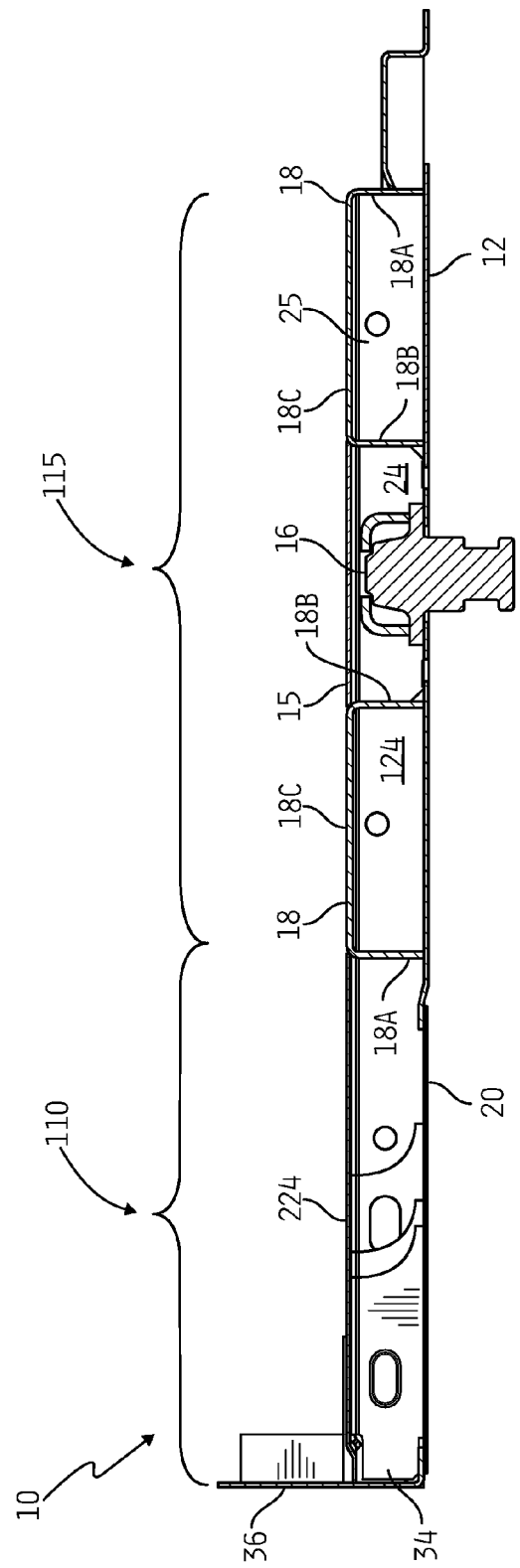
FIG. 4 is a cross-sectional view of another illustrative trailer coupler assembly taken along line 1B-1B of FIG. 1A.
Figure 5:
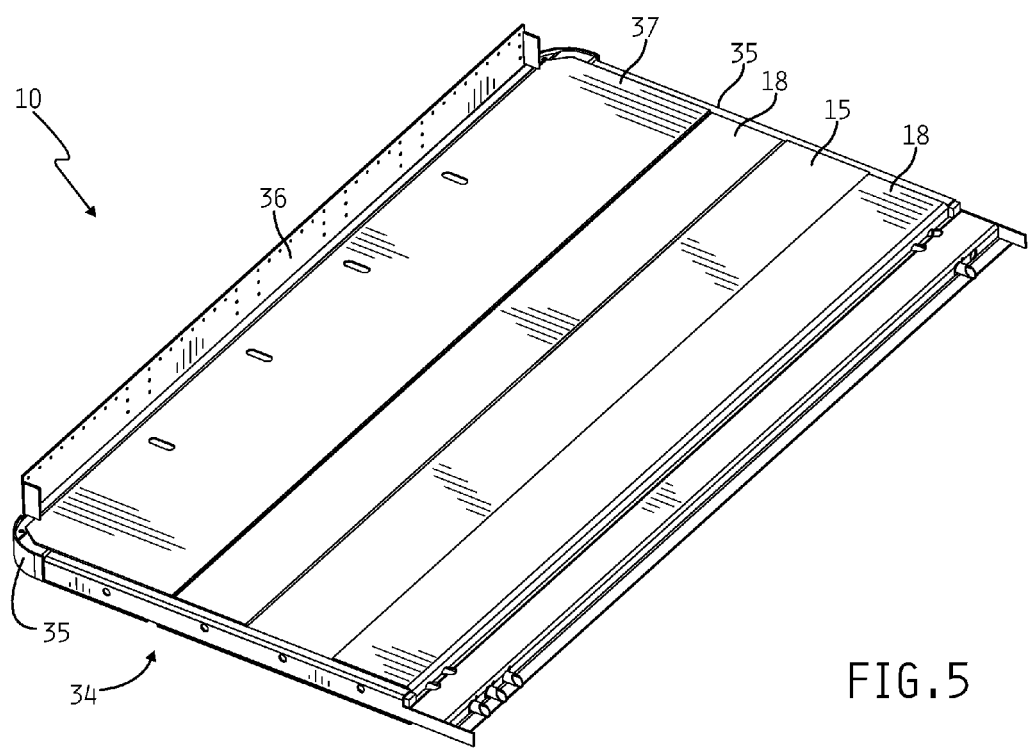
FIG. 5 is an exploded perspective view of a portion of yet another trailer coupler assembly including zinc block sacrificial anodes coupled to a support bracket of the assembly.

As shown in FIGS. 4-5, the frame 34 illustratively is formed of steel and includes a pair of side bars or side members 35 and a front plate or member 36. The components of the frame 34 may be attached together by welding. The front member 36 connects to an end of each side bar 35, and as such, the side members 35 are spaced apart from each other. Alternate frame 34 configurations may also be used.

The trailer coupler assembly 10 is coupled to the trailer 11 such that the trailer 11 may be connected to a semi-tractor (not shown) or other suitable vehicle. Illustratively, the trailer coupler assembly 10 is provided in and coupled to a floor region 21 (shown in FIG. 1B) of the trailer 11 and is located near the front end of the trailer 11. In particular, the trailer 11 includes a floor having a sub-floor 20 and a flooring surface 22 to define the floor region 21 of the trailer 11 therebetween, as shown in FIG. 1B. Illustratively, such flooring surface 22 is removed from the trailer 11 shown in FIG. 1A in order to access the interior of the floor region 21. Further illustratively, the trailer 11 is a box or van-type trailer including sidewalls 26, a roof 32 (FIG. 1) coupled to the sidewalls, and doors (not shown) provided in one or more of the sidewalls 26. In one illustrative embodiment, the trailer coupler assembly 10 illustratively may include a sacrificial element, for example first and second anodes 100, provided to retard the corrosion of other surrounding components of the trailer coupler assembly 10.

Grid or kingpin assembly 115 generally comprises grid plate 12 or kingpin plate 12, two cross-members 18, bolsters 18 or box beams 18, cover plate 15, and a kingpin assembly comprising the kingpin 16, the lower portion 19 or spool 16a. Welding together the cross members 18 and the plate 12 defines the channel(s) or interior portion(s) 25. The bolsters 18 may also be coupled together with the frame 34. Illustratively, the plate 12 may have a prepunched hole or aperture 17 defined therethrough and configured to receive therethrough the kingpin 16. In one illustrative embodiment, the kingpin may include a groove that facilitates welding together the kingpin 16 and the plate 12.

Referring to FIGS. 1A-2 and FIG. 4, the illustrative grid assembly 115 includes a support bracket 14 coupled to the plate 12, kingpin 16 coupled to the support bracket 14 and positioned to extend downwardly from the coupler grid plate 12 as shown in FIG. 1B, the plurality of cross-members 18 coupled to the plate 12 and the bracket 14, and, optionally, a plurality of dividers or ribs 24 coupled to the plate 12 and the cross-members 18. The coupler grid plate 12 forms the base of the trailer coupler assembly 10 and the bottom surface of the coupler grid plate 12 illustratively is generally flush with the bottom surface of the sub-floor 20. The coupler grid plate 12 typically occupies substantially the entire width of the trailer 11; however, it is within the scope of this disclosure to include a trailer coupler assembly having a coupler plate of any suitable size. For example, an illustrative grid plate may measure about 34 inches wide and about 102 inches or 8.5 feet long.

Figure 1A:
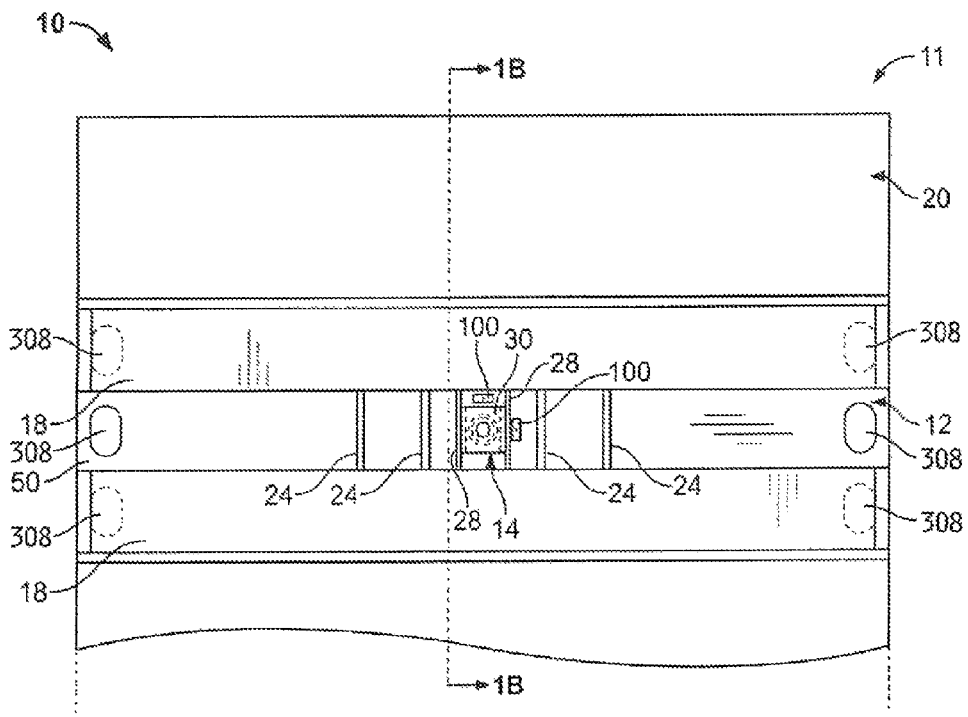
FIG. 1A is a top cut-away view of a trailer coupler assembly of the present disclosure coupled to a portion of a trailer.
Figure 1B:
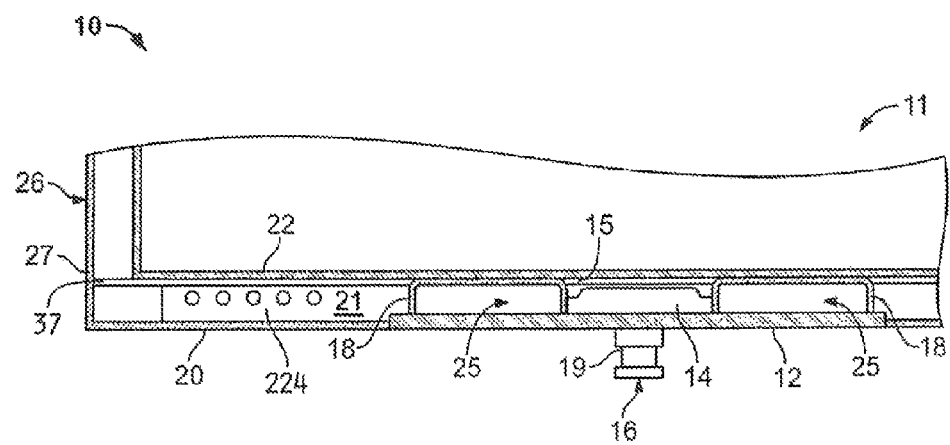
FIG. 1B is a cross-sectional view taken along line 1B-1B of FIG. 1A.
Figure 2:
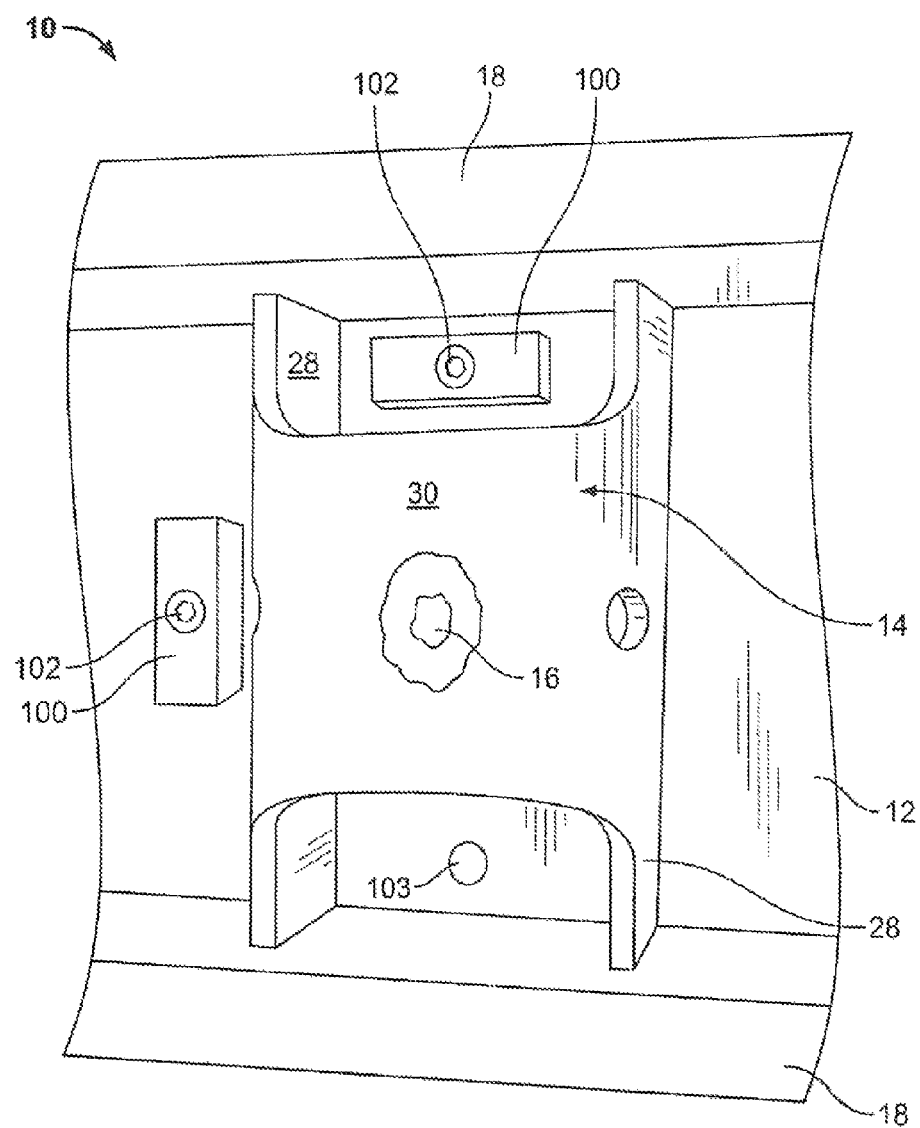
FIG. 2 is a top perspective view of the trailer coupler assembly showing two zinc block sacrificial anodes of the assembly.

Referring to FIGS. 1A and 1B, the plurality of cross-members or bolsters 18 may be mounted or coupled to the top surface of the coupler grid plate 12. Each cross-member 18 extends laterally across the width of trailer 11 and may be connected to the frame 34. The cross-members 18 are each formed in the shape of an upside-down "U" when viewed from the end (as shown in FIG. 1B) and each includes substantially flat or planar top and side walls and rounded corners. Illustratively, as shown in FIGS. 1A and 2, the two cross members 18 are parallel to and spaced-apart from each other such that a channel 50 is defined therebetween. More specifically, as seen in FIG. 4, each cross-member or bolster 18 illustratively has first and second spaced apart vertical or side walls 18A, 18B and a third horizontal or top wall 18C. The first and second walls 18A, 18B are attached to and extend upwardly from the plate 12, such that the first and second walls 18A, 18B are generally perpendicular to the plate 12. The horizontal or top wall 18C connects the first and second walls 18A, 18B at the top ends thereof, which illustratively are but need not be rounded. Bolsters or cross-members 18 may comprise a unitary or monolithic structure, or they may comprise separate components 18A, 18B, 18C that are connected or coupled together, for example by welding. Illustratively, respective sidewalls 18B of each cross member 18 are spaced apart from each other in order to define, along with grid plate 12, generally U-shaped channel 50 therebetween. The aperture 17 (FIG. 3) in the wall or grid plate 12 is positioned entirely between the walls 18B. Illustratively, the support bracket 14 may be positioned between the respective cross-members 18 as bounded by a respective side wall 18B of each of the cross-members 18 as shown for example in FIG. 1B, FIG. 2 and FIG. 4. Additional cross-members 18 may be provided if desired.

Looking now to FIG. 2, the illustrative support bracket 14, is generally "H-shaped" when viewed from above and is disposed in the space between the cross members 18. Illustratively, the support bracket 14 includes spaced-apart side arm portions 28 (corresponding to the vertical sides of the "H-shape") and a bridge portion 30 (corresponding to the horizontal middle of the "H-shape") extending between and coupled to the side arm portions 28. In particular, the bridge portion 30 is coupled to an upper end of each side arm portion 28 while a lower end of each side arm portion 28 is coupled to the grid plate 12. As such, the bridge portion 30 of the bracket 14 is spaced-apart from the coupler grid plate 12. Illustratively, the support bracket 14 is welded to the coupler grid plate 12; however, it is within the scope of this disclosure to couple the bracket 14 to the plate 12 by any other coupling structure. As is discussed in greater detail below, the support bracket 14 is coupled to the kingpin 16. While the particular support bracket 14 is shown and described herein, it is within the scope of this disclosure to include a trailer coupler assembly having any suitable bracket for coupling the kingpin 16 to the coupler plate 12.

Dividers 24 of the trailer coupler assembly 10 illustratively are positioned between the cross-members 18 on either side of the support bracket 14, as shown in FIGS. 1A and 1B. Illustratively, the dividers 24 are vertical plates secured to the coupler grid plate 12, the cross members 18 and the flooring surface 22. Dividers 24 illustratively conform to the shape of channel 50 and span the distance between walls 18B. Illustratively, because dividers 24 span the height of flooring region 21, the dividers 24 form substantially enclosed chambers between a set of dividers 24 or between a divider 24 and the support bracket 14. Illustratively, the dividers 24 are each welded to the grid plate 12 and the cross members 18; however, it is within the scope of this disclosure to couple the dividers 24 to the plate 12 and members 18 by any other suitable coupling structure. Illustratively, the area bounded by the bolster walls 18B and the first pair of dividers 24 proximate to either side of the kingpin aperture 17, in other words adjacent to respective arm portions 28, may be referred to as the kingpin box.

Figure 3:
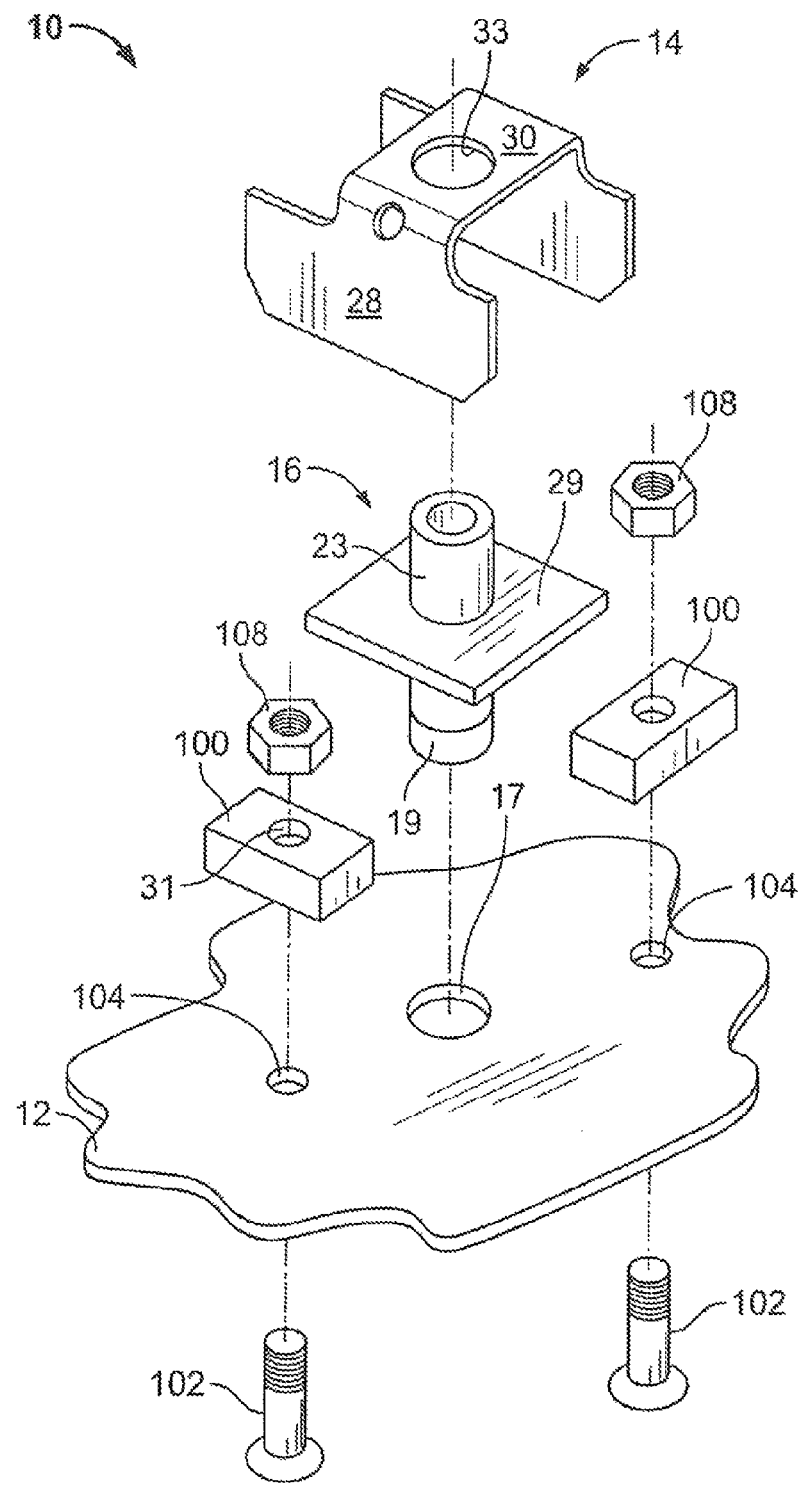
FIG. 3 is an upper perspective view of an illustrative upper coupler assembly.
Figure 6:
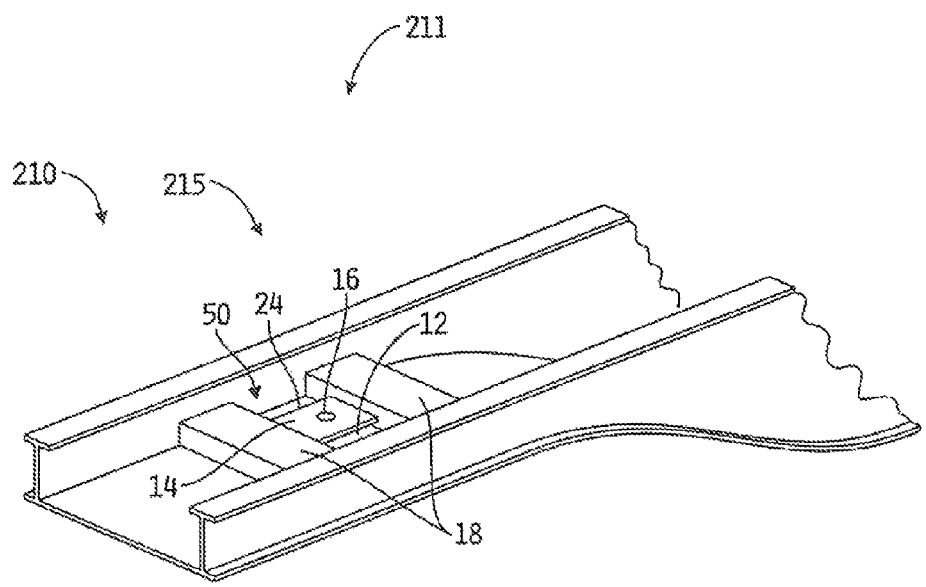
FIG. 6 is a perspective view depicting an illustrative trailer coupler.

Lower portion 19 of the kingpin 16 is received through aperture 17 in coupler grid plate 12 and is illustratively located approximately 36 inches rearward of a front end 27 of the trailer 11, as shown in FIGS. 1B and 3. An upper portion 23 of kingpin 16 is secured to the bridge portion 30 of the support bracket 14. Illustratively, an upper edge of the upper portion 21 of the kingpin 16 is received within an aperture 33 of the bridge portion 30 and is welded thereto. An apron plate 29 of the trailer coupler assembly 10 is coupled to the kingpin 16, as shown in FIG. 3, such that the upper portion 21 of the kingpin 16 is positioned above the apron plate 29 and the lower portion 19 of the kingpin 16 is positioned below the apron plate 29. When assembled, the bottom surface of the apron plate 29 is coupled to and adjacent the top surface of the coupler plate 12. In accordance with conventional operation, the lower portion 19 of kingpin 16 interfaces with a fifth wheel (not shown) of a semi-tractor or interfaces with a stanchion plate (not shown) of a railway car, for example. Illustratively, while various components of the trailer coupler assembly 10 are shown in FIGS. 1A-3, it is within the scope of this disclosure to include alternative trailer coupler assemblies having other suitable components coupled to a trailer to permit the trailer to be coupled to a semi-truck, for example. For example, the illustrative embodiment depicted in FIG. 4 includes stiffeners 124 spanning the forward or front main channel 25. Another illustrative embodiment (FIG. 6) depicts a flatbed trailer 211 having an illustrative coupler assembly 210 including illustrative grid assembly 215. Illustratively, grid assembly 215 is substantially similar to grid assembly 115. For example, grid assembly 215, illustratively comprises grid plate 12, cross-members 18 coupled to grid plate 12 and defining therebetween kingpin channel 50, and dividers 24 and kingpin 16 disposed within channel 50. Grid assembly 215 may but need not further include support bracket 14 and/or cover plate 15 (not shown in FIG. 6). Illustratively, coupler assembly 210 has a width of about 44 inches and a length of about five (5) feet. Illustratively, top flat faces or walls of each cross-member 18 of coupler assembly 210 have a width of about 10 inches and a length of about 44 inches. Cover plate 15 (if included) is approximately 10 inches wide and approximately 44 inches long.

Illustratively, components of the trailer coupler assembly 10, 210 including the kingpin 16, the coupler plate 12, the support bracket 14 (if included), and the apron plate 29 (if included) are made of metal and/or metallic alloys, such as steel, which have high strength and durability. As noted above, these components are welded to each other at their connections, such as at the contact between the kingpin 16 and the support bracket 14 and the contacts between the support bracket 14 and the cross members 18. However, it is within the scope of this disclosure to couple the components of the trailer coupler assembly 10 to each other using other suitable fastening structures such as bolts, screws, rivets, epoxy, adhesives etc.

In an illustrative embodiment depicted in FIGS. 2 and 3, the anodes 100 are depicted. It will be appreciated that anodes 100 are illustrative only and are not necessary. First and second zinc blocks 100 are attached to the coupler grid plate 12 adjacent the support bracket 14 and the kingpin 16. Illustratively, the zinc blocks 100 operate as sacrificial anodes to retard (e.g., delay) or even stop the corrosion of the surrounding steel components of the trailer coupler assembly 10, 210. Illustratively, sacrificial anodes include a metal having a more negative electrochemical reduction potential than any of the metal(s) used to form the surrounding components of the trailer coupler assembly 10, 210 and the metal(s) used to weld the components of trailer coupler assembly 10 together. Stated differently, sacrificial anodes, such as the illustrative zinc blocks 100, include a metal that will oxidize more readily than any the metal(s) used in the components, fasteners, and/or welding adjacent to and surrounding the sacrificial anodes. Further illustratively, while the blocks 100 of the trailer coupler assembly are zinc, it is within the scope of this disclosure to substitute or include other suitable metals that oxidize more readily than the metal(s) used to form the various components of the trailer coupler assembly 10. Examples include, but are not limited to, magnesium, aluminum, and alloys of zinc, magnesium, and aluminum. Furthermore, while the entirety of the blocks 100 are generally formed of zinc, it is within the scope of this disclosure to include sacrificial anodes which are only partially formed of one or more of the aforementioned or other suitable metals.

As noted, in one illustrative embodiment zinc blocks 100 operate to retard or even prevent the corrosion of the components and welds of trailer coupler assembly 10 which have a less negative electrochemical reduction potential than the electrochemical reduction potential of the zinc blocks 100. Referring again to FIGS. 2 and 3, the trailer coupler assembly 10 includes the first and second zinc blocks 100 attached to the coupler grid plate 12 adjacent to the support bracket 14 and the kingpin 16. As shown in FIG. 2, one of the zinc blocks 100 is coupled to the plate 12 at a location adjacent to and aligned with one of the side arm portions 28 of the support bracket 14. Illustratively, this zinc block 100 is spaced-apart from the left side arm portion 28, as shown in FIG. 2, outside the bracket 14. The other zinc block 100 is illustratively positioned between the side arm portions 28 at a location above the kingpin 16, as shown in FIG. 2. However, it is within the scope of this disclosure to couple the zinc blocks 100 to any suitable location on the coupler plate 12 in order to retard or prevent the corrosion of adjacent metal components of the trailer coupler assembly 10. For example, a zinc block may be coupled at any location inside or outside the side arms 28 of the support block 14. The zinc blocks 100 may also be attached to the coupler grid plate 12 at a location further from the bracket 14, such as within an interior portion or channel 25 (shown in FIG. 1B) of one or more of the cross members 18. Further, the zinc blocks 100 may be positioned at a location between two adjacent dividers 24, for example.

Illustratively, each zinc block 100 is coupled to coupler plate 12 by a bolt 102 received though through a hole 31 in the zinc block 100 and a hole 104 (shown in FIG. 3) in the coupler grid plate 12. A nut 108 is fastened to the bolt 102. Alternatively, hole 104 may contain threading such that bolt 102 is fastened to coupler grid plate 12 without protruding below the bottom surface of coupler grid plate 12. Further, aperture 31 in zinc block 100 may contain threading (not shown) such that zinc block 100 is threadably coupled to a screw (not shown) with or without the use of nut 108. Illustratively, bolt 102 and/or the screw may be countersunk into the bottom surface of coupler plate 12 such that the head of bolt 102 or the screw does not substantially protrude below the bottom surface of coupler grid plate 12. As will be appreciated, numerous structures are available to attach the zinc block sacrificial anodes 100 to the coupler grid plate 12. While the zinc blocks 100 may be attached in a permanent fashion by methods such as welding, the zinc blocks 100 in the illustrated embodiment are removably attached to coupler grid plate 12 so that the zinc blocks 100 may be replaced when they have wholly or partially lost the ability to retard corrosion of the surrounding trailer assembly components. As such, while each zinc block 100 is illustratively coupled to plate 12 through the use of bolt 102 or a threaded screw, it is within the scope of this disclosure to couple zinc blocks 100 to coupler plate 12 using other suitable fasteners such as nails, adhesives such as epoxy, welding, etc.

Illustratively, access ports, cutouts or holes 308, as well as drain holes 103, may be defined in the grid plate 12 as well as in the bottom 20 (not shown). These access ports 308, 103, as well as other holes such as for example holes 104 in the event blocks 100 and screws 102 are absent, may be used to inspect the inner recesses of the channels, may serve as drain holes, and/or may be used to allow spray access to accomplish the spray galvanization and/or subsequent coating process. Holes 103, 104, 308 may be cut directly from the coupler grid plate 12 and/or floor 20 during manufacturing of the trailer coupler assembly 10, 210 or may be independently formed of the same or a different metal or alloy, as the coupler plate 12 itself. Illustratively, the access holes 308 are generally oval in shape and may be equipped with similarly shaped plugs the may be received in the holes 308. However, it is within the scope of this disclosure to include access holes and plugs of any suitable shape or size. For example, the access holes and plugs may be circular 103, 104, rectangular, square-shaped, etc.

Illustratively, access plugs may be removably disposed in holes 308, such that servicing of the trailer coupler assembly 10, 210 including applying new spray or injection coatings, servicing support block 14, and replacing/servicing the zinc blocks 100, may be performed from beneath the trailer 11.

Sacrificial anodes 100 illustratively are generally rectangular in shape, cylindrical in shape, or are T-shaped. However, anodes of any suitable shape and size may be alternatively used with the coupler assembly 10. For example, anodes having rectangular, cubic, cylindrical, oval, and other configurations or combinations thereof may be used.

Further, while each sacrificial anode 100 is fastened to another one of the respective trailer coupler assembly components, such as coupler plate 12 and support bracket 14, using bolts or screws, it is within the scope of this disclosure to position sacrificial anodes within enclosed compartments of a trailer coupler assembly as well. In particular, a plurality of sacrificial anodes may be disposed loosely within a substantially enclosed chamber formed between a set of two adjacent dividers 24 or between a divider 24 and support bracket 14. Further illustratively, sacrificial anode 100 may be positioned loosely within the interior portion 25 of cross-members 18.

Illustratively, the structure for attaching sacrificial anodes 100 to trailer coupler assembly 10, 210 may be used in conjunction with one another and/or with other attachment structures. For example, sacrificial anode(s) 100 may be attached to coupler grid plate 12, sacrificial anode(s) 100 may be attached to support bracket 14, and sacrificial anode(s) 100 may be attached to access plugs (not shown). Further, while sacrificial anodes 100 are illustratively coupled to coupler grid plate 12, support bracket 14, and access plug(s), such anodes 100 may be coupled to other components of coupler assembly 10, 210 as well. For example, sacrificial anode(s) 100, may be coupled to kingpin 16, apron plate 29, cross-members 18, and/or dividers 24, for example. Accordingly, the sacrificial anodes may be coupled directly or indirectly to any suitable component of coupler assembly 10, 210.

Illustratively, apron assembly 110 generally comprises a bottom plate, which may comprise the subfloor 20, and illustratively may include a plurality of vertical members or stiffeners or reinforcements or dividers 224. Illustratively, vertical members 224 and the bottom plate 20 may be coupled together as for example by welding. The vertical members 224 and bottom plate 20 may also be coupled together with frame 34. A front plate 36 may also be coupled together with the bottom plate 20, as by for example and without limitation a seal weld, and with the frame 34. An apron channel cover or floor plate 37 may cover the apron channel defined between opposing front plate 36 and main channel wall 18A and opposing side members 35. Cover plate 37 may be attached together with the frame 34, the main channel bolster 18 and/or the dividers 224. While not shown, an apron assembly may but need not be included in coupler assembly 210.

A method of manufacture or assembly 170 (FIG. 8) of upper coupler assembly 10, 210 including the galvanization of portions of the kingpin channel 50 area will now be described. It should be understood that while illustrative embodiments of upper coupler assembly 10, 210 are described, multiple other possible embodiments exist, which could be manufactured according to the method.

In an illustrative assembly line or manufacture or manufacturing line 170 and process 170 (FIG. 8), each of the apron assembly 110 and the grid assembly 115, 215 may be assembled as described herein as they move down separate lines, for example on a roller conveyor, or down the same line, or down a combination of separate and same lines. For example, apron assembly 110 may have bottom plate 20, vertical reinforcements 224, frame 34 and front plate 36 coupled together on an apron assembly manufacturing line 171 in one illustrative embodiment. An apron assembly cover or top plate 37 also may be positioned over the frame 34 and coupled together therewith. Similarly, grid assembly 115, 215 may have grid plate 12, cross members 18 and dividers 24 coupled together on a separate or on the same assembly manufacturing line 171. The kingpin 16 may be dropped in or inserted through aperture 17 and welded together with plate 12. In one illustrative embodiment, stiffeners 124 may be included in forward or main channel 25. The apron assembly 110 and the grid assembly 115 may be brought together in an abutting relationship either on the initial line 171 or on the finishing line 175. Illustratively, apron assembly 110 and grid assembly 115 may be welded together, for example and without limitation by a seam weld.

If grid assembly 215 is coupled together with an apron assembly, a seam weld may be used.

Figure 7:
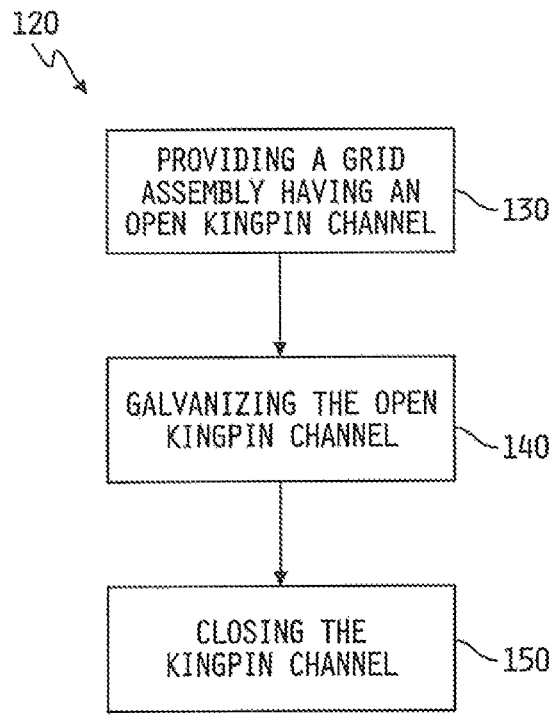
FIG. 7 is a flow chart depicting the steps of an illustrative method of galvanizing the kingpin channel.
Figure 8:
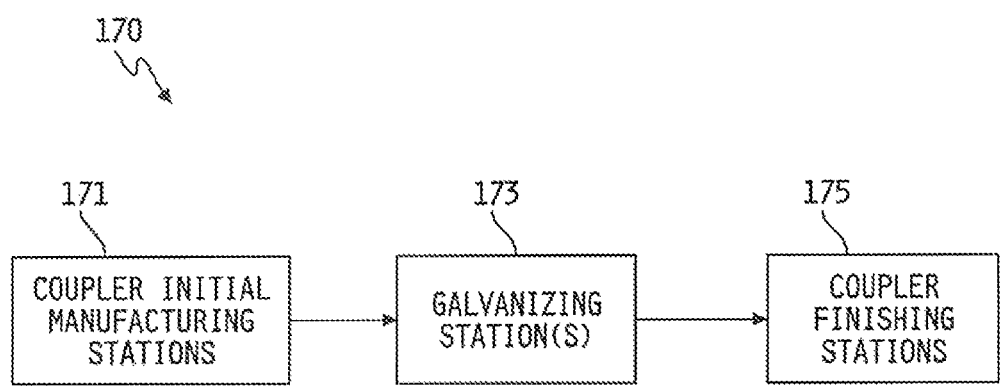
FIG. 8 is a diagrammatic view of an illustrative manufacturing line for making an illustrative trailer coupler according to the illustrative method.

Referring to FIG. 7 and FIG. 8, during assembly process 170, kingpin channel or box section 50 of coupler 10, 210 may be galvanized or coated 120, for example by thermal spraying 120. Illustratively, the entire length and width of, including all upstanding bolster or cross-member side walls 18B, frame side bars or side members 35 and dividers 24 defining or disposed within the channel 50 may be sprayed, galvanized or coated 140. This coating process 140 may be applied in-line 170 at a galvanizing, coating, or spraying station 173. If desired, galvanizing station 173 could be located off the manufacturing line 170, however. Galvanizing station 173 illustratively may comprise a spraying, spray, coat or coating booth and, but not necessarily a blast or blasting booth. For example, if a portion to be sprayed has an abrasive surface, then it may be desirable to grit blast or otherwise prepare or prep that surface to ensure good adhesion of the spray coat. For example, the illustrative apparatus 10, process 120 and assembly 170 may include prepping or preparing, such as for example by abrading, the area or surface to be coated, for example galvanized, prior to spray galvanizing the desired surface or area. Illustrative examples of prepping the surface may include for example and without limitation blasting, sanding, grinding, peening, and chemical etching. Blasting, for example, may be accomplished by sand blasting or grit blasting. Sanding and grinding may illustratively be accomplished by using an abrasive pad or wheel. If, however, the portion to be sprayed or coated is not a surface that will be exposed to abrasion, then adhesion of the coating, which is primarily a sacrificial layer, may not be necessary thereby obviating the need, but not necessarily the desire for a blast booth.

In an illustrative embodiment, galvanizing step 140, also referred to as applying step 140 or spraying step 140 or coating step 140, may be incorporated into the manufacture line or process 170 at any desired point prior to coupling cover plate 15 to grid assembly 115, or, if included, to grid assembly 215. For example and without limitation, applying, galvanizing, coating or spraying step 120 could be accomplished after grid assembly 115, 215 is assembled, after apron assembly 110 and grid assembly 115, 215 (if coupled to an apron assembly) are joined together, and/or after kingpin 16 is dropped into the aperture in the grid plate spraying 120 could be accomplished before or after apron assembly 110 and grid assembly 115 are brought together, and before or after kingpin 16 is inserted into aperture 17 of grid plate 12. It will be appreciated that in the event grid assembly 215 includes a cover plate 15, and/or is coupled to an apron assembly, the same flexibility in incorporating the spraying step 140 would also obtain. In addition to spraying or coating inner surfaces of walls 18B and grid plate 12 that define channel 50, and coating the surfaces of dividers 24, the applying or spraying step 140 may include coating or spraying kingpin 16 or a portion of kingpin 16, illustratively upper portion 23 and apron 29 (if included) which are disposed within the channel, and supporting structure including for example bracket 14 (if included). Similarly, if an anode 100 is included, it, along with bolt 102, and nut 108, may be sprayed if desired. Illustratively, the selected area that is selectively sprayed or coated may be the structure within the channel 50 extending about 12 inches to about 20 inches transversely from the kingpin within the channel. For example, the portion of the kingpin within the channel such as the upper portion 23 and apron 29 (if included), the floor of the channel 12 within the selected area, the side walls 18B defining the channel within the selected area, the bracket or other support structure (if any), and the dividers if any within the selected area. One illustrative method contemplates galvanizing selected areas, for example channel 50 including kingpin 16 and supporting structure 14 after initial manufacturing or assembly 117, 130, and prior to closing the channel step 150. During the closing step 150, cover plate 15 is disposed to cover channel 50. Cover plate 15 illustratively is attached or coupled together with the side members 35 of the frame 34. Cover plate 15 may further be coupled or attached together with one or more of the dividers 24 and the cross-members. In the event that the coupler assembly does not include a cover plate 15, then the closing step may be omitted. Illustratively, kingpin channel 50 and components disposed therein could also be sprayed by inserting a wand for example through any of holes 103, 104, 308 even after the cover plate 15 has been attached. It will also be appreciated, that other components, including other channels 25 may be galvanized. For example, if main channel 25 includes stiffeners 124 as in one illustrative embodiment, then channel 25 and/or the stiffeners 124 could also be galvanized as described. Illustratively, channel 25 and/or stiffeners 124 could be sprayed by inserting a wand through any of holes 308. So, too, the interior surfaces of bolster 18 and/or stiffeners 124 could be sprayed prior to being attached to grid plate 12. Further illustratively, top face 18C of main channel bolster 18 may be attached to side walls 18A, 18B after the main channel area 25 and/or stiffeners 124 are sprayed. It will also be appreciated that any other area of coupler assembly 10, 210 including for example front dividers 224 and/or bottom plate 20, and/or front plate 36, and/or frame 34 may be sprayed.

The spraying or galvanizing step 140 may be accomplished by any suitable method. For example, it could be applied manually by a person for example, or through an automated machine as for example by a robot. Illustratively, the coating material and method of deposit may be chosen as well. Examples of suitable coatings include, but are not limited to, zinc, magnesium, aluminum, and alloys of zinc, magnesium, and aluminum. Examples of suitable methods of deposit include thermal spray systems such as for example and without limitation an electric-arc spray system, a plasma-arc spray system, detonation gun system, and a flame spray system. Illustrative flame spray systems may include powder or wire systems, including conventional, high velocity, high-velocity oxy-fuel (HVOF), high-velocity air fuel (HVAF), and D-gun spray systems. The galvanizing or coating step may also be customized to define the area of coverage and the thickness of the spray deposited over that area. The thickness may be defined or built, for example by the amount of time that the spray coating is applied and/or by the number of coats that are applied. Illustratively, the coating thickness could be between about 0.2 and about 20 mils. In one embodiment the coating thickness is about 3.0 mils.

By galvanizing selected areas, for example critical areas, the illustrative method saves weight and expense. For example, an illustrative embodiment that galvanizes channel 50, kingpin 16 and supporting structure may add a protective zinc coating weighing about 2.5 pounds as compared to a zinc coating weighing about 35-40 pounds or more using a conventional method such as for example hot-dip galvanizing. Illustratively, a coating weight reduction of 70% to 90% for a coupler assembly 10, 210 may be realized by using the illustrative method. Indeed, the illustrative method can be used to target only critical areas, for example structural areas that are prone to corrosion. The illustrative spray methods allow for the use of lower substrate peak temperatures relative to for example hot-dip galvanizing. The relatively lower temperatures of the illustrative process protect the zinc coating from heat generation and do not therefore alter the underlying material properties, for example the molecular or physical structure or properties of the coated metal or material.

Coupler finishing stations 175 may include a top plate attaching or attachment station and a second coating station. In the coupler finishing stations 175, among other things, closing the kingpin channel step 150 may be completed and coupler assembly 10, 210 illustratively may be coated with another rust inhibiting or rust preventative coat. Even areas that have been galvanized during the spraying step 140 may be further coated. Illustratively, this further coating may be an injection coating of for example and without limitation a wax coating, an epoxy paint, or a water emulsified asphaltic coating. For example, the wax-based coating may be applied to the underbody, including for example the outer facing surfaces of grid plate 12 and subfloor 20. In addition, the wax-based coating may be injected into the various channels 25, 50 of the coupler assembly 10 for example through a high-pressure wand inserted into holes 308 and/or holes on the weld reinforcements. While this injection coating will protect the portions that have not been galvanized, it may also mix with the particles of the spray coating from spraying step 140 that did not get fully fused to the assembly metal, for example zinc particles, which particles will be retained and will serve as further sacrificial material to further protect the galvanized areas.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of making a vehicle coupler assembly comprising the steps of:
    assembling together a coupler assembly, the coupler assembly comprising
        a coupler grid plate, and
        a kingpin coupled together with the coupler grid plate and extending below a surf ace of the coupler grid plate;
    thereafter applying a coating to a selected area of the coupler assembly, the selected area having a surface area less than a total surface area of the coupler assembly; and
    finishing the coupler assembly.

2. The method of claim 1 wherein the applying step comprises applying the coating to an approximate thickness of between about 0.2 mils and about 20 mils.

3. The method of claim 1 wherein the selected area is defined by a pair of spaced apart and generally parallel cross-members and a pair of spaced apart and generally parallel first and second dividers, the pair of dividers being disposed generally between and parallel to the pair of spaced apart cross-members; and wherein the coating galvanizes the selected area of the coupler assembly.

* * * * *